(12) United States Patent
Tan

(10) Patent No.: US 8,736,586 B2
(45) Date of Patent: May 27, 2014

(54) MULTIFUNCTION STYLUS

(75) Inventor: Chuan-Kang Tan, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 992 days.

(21) Appl. No.: 12/781,128

(22) Filed: May 17, 2010

(65) Prior Publication Data

US 2011/0100729 A1   May 5, 2011

(30) Foreign Application Priority Data

Oct. 30, 2009   (CN) .......................... 2009 1 0309180

(51) Int. Cl.
*G06F 3/033*   (2013.01)
(52) U.S. Cl.
USPC .......................................................... 345/179

(58) Field of Classification Search
USPC ............................... 345/179; 361/1–3, 56–59
See application file for complete search history.

(56) References Cited

U.S. PATENT DOCUMENTS

| 3,850,056 | A | * | 11/1974 | Allen .............................. 81/438 |
| 6,094,785 | A | * | 8/2000 | Montgomery et al. .......... 24/324 |
| D526,682 | S | * | 8/2006 | Ortiz et al. ..................... D19/36 |
| 7,404,563 | B2 | * | 7/2008 | Hernandez et al. ............. 279/14 |

* cited by examiner

*Primary Examiner* — Yong H Sim
(74) *Attorney, Agent, or Firm* — Novak Druce Connolly Bove + Quigg LLP

(57) ABSTRACT

A multifunction stylus is configured to be applied to an electronic device. The electronic device includes a main body and a cover detachably latched to the main body. The multifunction stylus includes a holder and a detaching member rotatably hinged to the holder configured for detaching the cover from the main body. The holder has a stylus tip positioned at one end thereof and a tool head positioned at an opposite end thereof. The detaching member defines an accommodating space adjacent to one end thereof configured for optionally accommodating the stylus tip or the tool head therein.

7 Claims, 4 Drawing Sheets

MULTIFUNCTION STYLUS

BACKGROUND

1. Technical Field

This exemplary disclosure generally relates to a multifunction stylus.

2. Description of Related Art

Portable electronic devices such as mobile phones and personal digital assistants (PDAs) are now widely used. Consumers may enjoy the full convenience of the portable electronic devices almost anytime and anywhere. Most of these portable electronic devices are known to include a touch screen and an attached stylus configured to operate and control the touch screen.

Generally, the existing stylus can only function to touch the touch screen of the portable electronic device, and cannot meet the multiple requirements of the user.

Therefore, there is room for improvement within the art

BRIEF DESCRIPTION OF THE DRAWINGS

Many aspects of the exemplary multifunction stylus can be better understood with reference to the following drawings. The components in the various drawings are not necessarily drawn to scale, the emphasis instead being placed upon clearly illustrating the principles of the exemplary multifunction stylus. Moreover, in the drawings, like reference numerals designate corresponding parts throughout the diagrams.

DETAILED DESCRIPTION

In the exemplary embodiment, the multifunction stylus is applied to an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
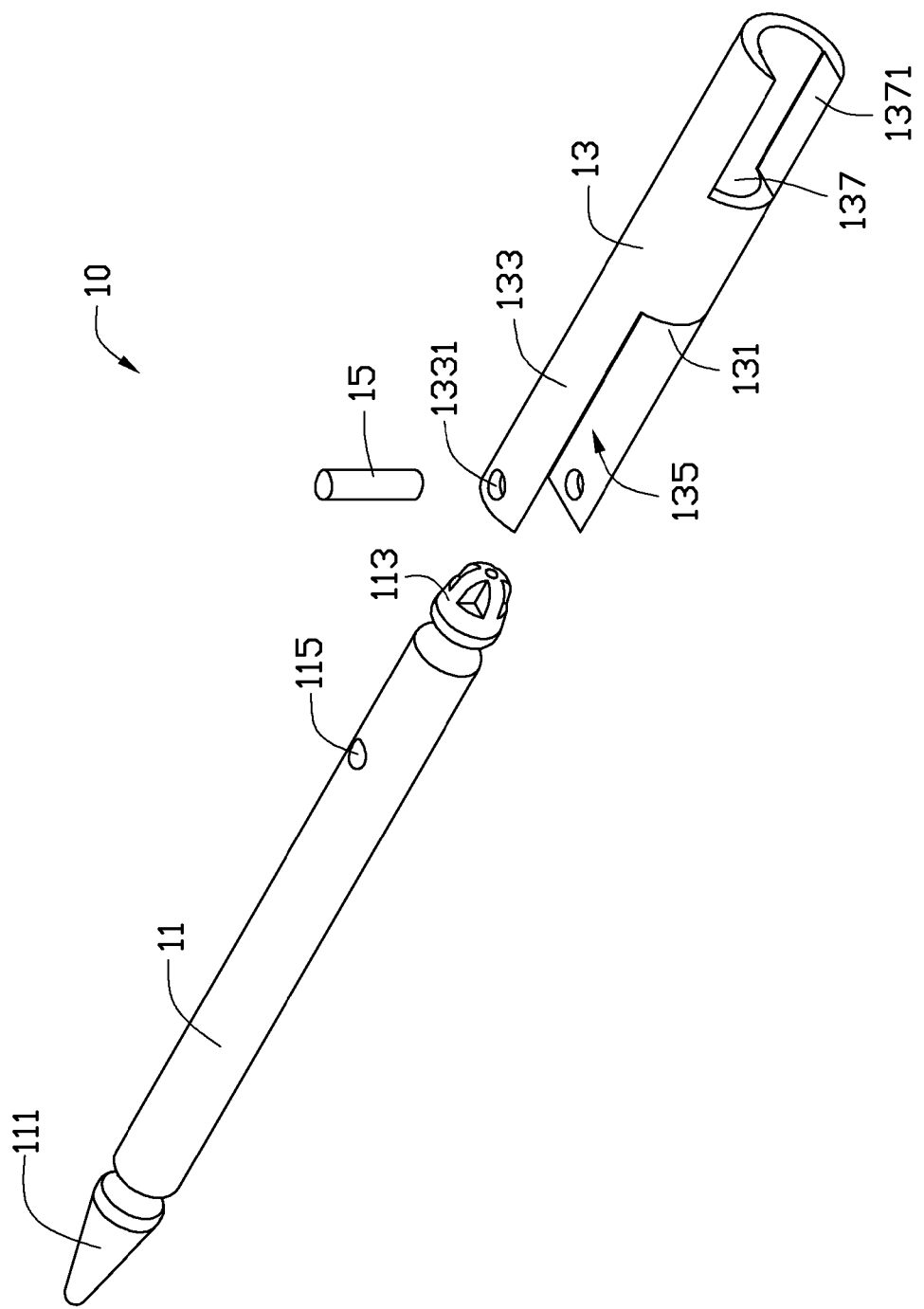
FIG. 1 shows an exploded perspective view of a multifunction stylus, in accordance with an exemplary embodiment.

FIG. 1 shows an exploded perspective view of an exemplary multifunction stylus 10. The multifunction stylus 10 includes a holder 11, a detaching member 13, and an axle 15. The holder 11 is rotatably hinged to the detaching member 13 by the axle 15.

Figure 2:
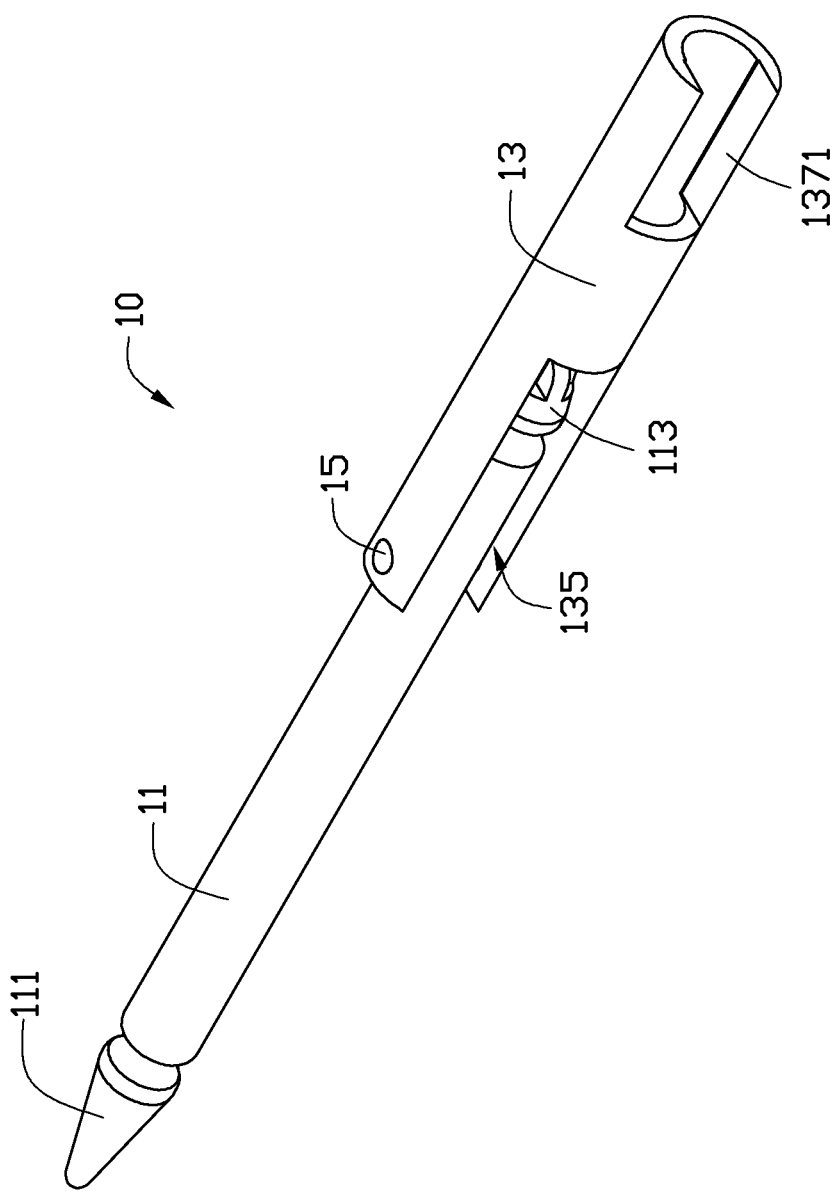
FIG. 2 shows an assembled perspective view of the multifunction stylus.

Referring to FIG. 2, the holder 11 includes a stylus tip 111 positioned at one end thereof and a tool, such as a screwdriver head 113 positioned at the opposite end thereof. The stylus tip 111 is configured to touch a touch screen of an electronic device. The screwdriver head 113 can be integrally formed at the distal end of the holder 11 opposite to the stylus tip 111. The screwdriver head 113 can be a plurality of screwdriver types such as, a slot head screwdriver, a Phillips head screwdriver, or a hex socket screwdriver. In the present embodiment, the screwdriver head 113 is a Phillips head screwdriver. The holder 11 further includes a shaft hole 115 defined therethrough adjacent to the screwdriver head 113.

The detaching member 13 may be substantially barrel shaped or tubular shaped and made of metal material such as stainless steel material. One end of the detaching member 13 forms a substantially U-shaped gap 131 corresponding to the location of the screwdriver head 113 of the holder 11, thereby forming two substantially parallel and opposite longitudinal holding arms 133. The two holding arms 133 together define an accommodating space 135 therebetween. The accommodating space 135 is configured to accommodate the screwdriver head 113 of the holder 11. The length of the holding arm 133 is slightly longer than the length between the shaft hole 115 and the distal end of the screwdriver head 113. Each holding arm 133 defines a through hole 1331 corresponding to the shaft hole 115 of the holder 11. The opposite end of the detaching member 13 forms a substantially U-shaped detaching groove 137 and thereby forming two detaching arms 1371 on the two sides of the detaching groove 137. The two detaching arms 1371 are substantially thin blade shaped.

The axle 15 is configured to hinge the holder 11 with detaching member 13. The diameter of the axle 15 is slightly less than the diameter of the shaft hole 115 of the holder 11 such that the holder 11 can rotate relative to the axle 15.

To assemble the multifunction stylus 10, the screwdriver head 113 of the holder 11 is inserted into and accommodated within the accommodating space 135 of the detaching member 13. The screwdriver head 113 of the holder 11 is then positioned between the two holding arms 133. The two through holes 1331 are aligned with the corresponding shaft hole 115 of holder 11. After that, the axle 15 is inserted into one through hole 1331, the shaft hole 115 and the other through hole 1331 correspondingly. The two ends of the axle 15 are fixed within the corresponding two through holes 1331 of the detaching member 13 respectively. Then, the holder 11 is rotatably hinged to the detaching member 13 by the axle 15.

Figure 3:
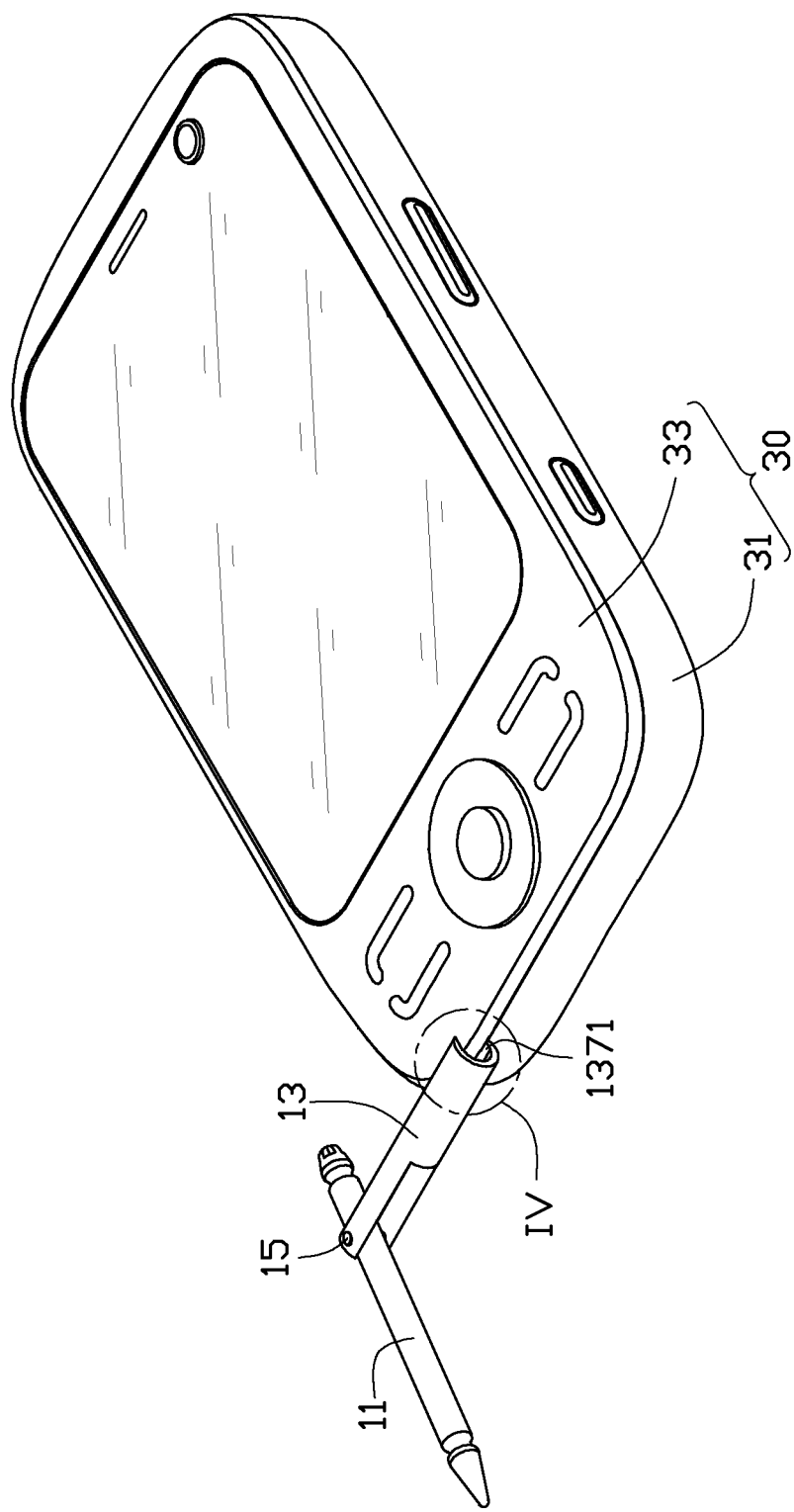
FIG. 3 shows a schematic view of the multifunction stylus applied to detach a portable electronic device as a detachment tool.
Figure 4:
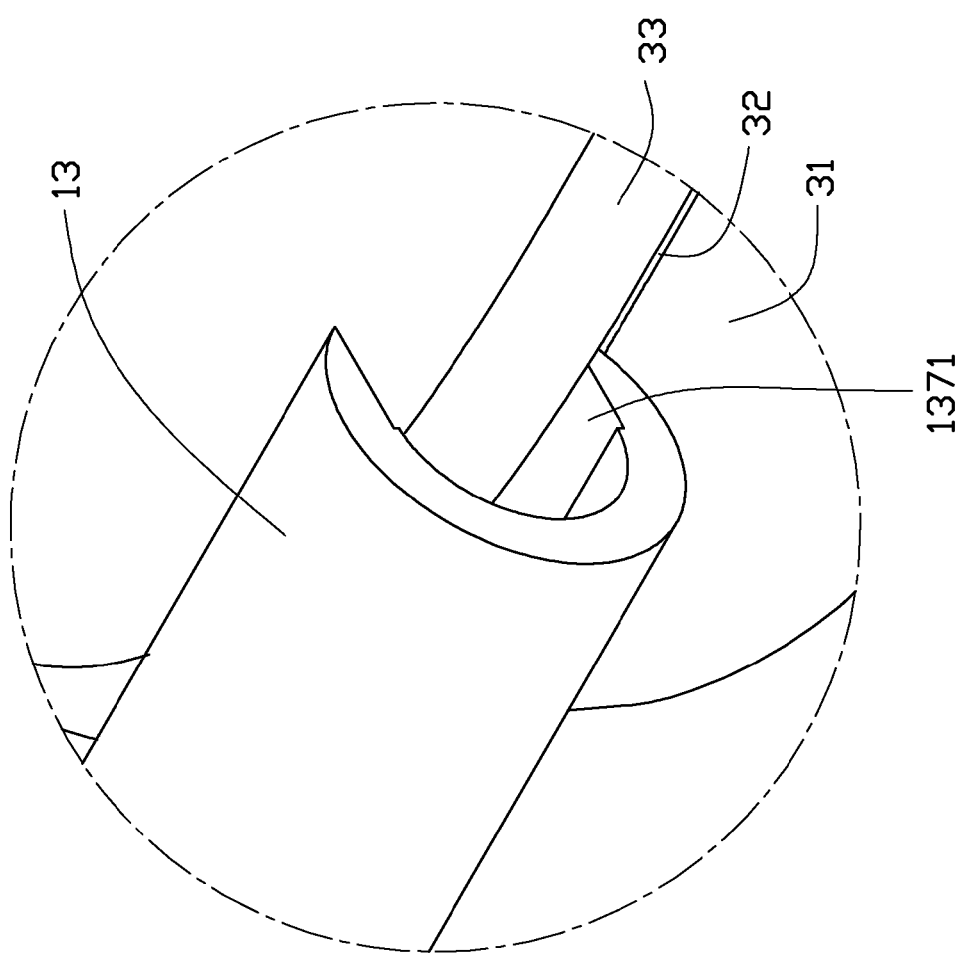
FIG. 4 shows an enlarged view of the IV area of FIG. 3.

Referring to FIGS. 3 and 4, in use, the multifunction stylus 10 is applied to an electronic device 30 with a touch screen. The holder 11 aligns with detaching member 13 and the screwdriver head 113 is accommodated within the accommodating space 135 of the detaching member 13 correspondingly. In the exemplary embodiment, the electronic device 30 is a mobile phone and includes a main body 31 and a cover 33. The cover 33 is attached to the main body 31 and thereby forming a slight gap 32 therebetween. When detaching the cover 33 from the main body 31, the holder 11 is rotated relative to the axle 15 and the detaching member 13, to form an angle substantially 90 degrees with the detaching member 13. Then, one of the two detaching arms 1371 of the detaching member 13 is inserted into the slight gap 32 of the electronic device 30, the stylus tip 111 of the holder 11 is pressed to detach the cover 33 from the main body 31. After that, by keeping the rotation of the holder 11 relative to the detaching member 13, the stylus 10 can be used as a screwdriver. As the holder 11 is rotated back to its original position, such that, the multifunction stylus 10 is used as a touching stylus.

It is to be understood that the shaft hole 115 is defined through at substantially the middle portion of the holder 11, such that the stylus tip 111 and the opposite screwdriver head 113 can be optionally accommodated within the accommodating space 135 of the detaching member 13.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A multifunction stylus configured to be applied to an electronic device, wherein, the electronic device includes a main body and a cover detachably latched to the main body; the multifunction stylus comprising:
   a holder having a stylus tip positioned at one end thereof and a screwdriver head positioned at an opposite end thereof; and
   a detaching member rotatably hinged to the holder configured for detaching the cover from the main body;
   wherein the detaching member defines an accommodating space adjacent to an end and longitudinally defines a detaching groove at an opposite end and thereby forming two detaching arms on two sides of the detaching groove, the two detaching arms are substantially blade shaped, the accommodating space is configured for optionally accommodating the stylus tip or the screwdriver head therein.

2. The multifunction stylus as claimed in claim 1, wherein the screwdriver head is a slot head screwdriver, a Phillips head screwdriver, or a hex socket screwdriver.

3. The multifunction stylus as claimed in claim 1, wherein the two detaching arms are made of metal material.

4. The multifunction stylus as claimed in claim 1, wherein the holder includes a shaft hole defined therethrough, the multifunction stylus further includes an axle configured to hinge the holder to the detaching member; the axle passes through the shaft hole of the holder rotatably and the two ends of the axle are fixed to the detaching member.

5. The multifunction stylus as claimed in claim 3, wherein the accommodating space is a substantially U-shaped gap defined at one end of the detaching member and thereby forming two parallel holding arms opposite to each other longitudinally; the stylus tip or the screwdriver head is optionally accommodated within accommodating space and positioned between the two holding arms.

6. The multifunction stylus as claimed in claim 4, wherein each holding arms defines a through hole corresponding to the shaft hole of the holder, the two ends of the axle are fixed within the corresponding two through holes of the detaching member respectively.

7. The multifunction stylus as claimed in claim 5, wherein the holder is substantially cylinder shaped, the screwdriver head is integrally formed at the distal end of the holder opposite to the stylus tip.

* * * * *